United States Patent [19]

Van Steenwyk et al.

[11] Patent Number: 5,520,246

[45] Date of Patent: May 28, 1996

[54] MULTI-MODE CUSHIONING AN INSTRUMENT SUSPENDED IN A WELL

[75] Inventors: Donald H. Van Steenwyk, San Marino; Raymond W. Teys, Pismo Beach, both of Calif.; Robert M. Baker, The Woodlands, Tex.

[73] Assignee: Scientific Drilling International, Houston, Tex.

[21] Appl. No.: 337,731

[22] Filed: Nov. 14, 1994

[51] Int. Cl.⁶ ............................. E21B 17/07; G01D 11/10
[52] U.S. Cl. ............................ 166/242; 166/316; 175/40; 73/431
[58] Field of Search .................. 175/40, 320; 166/242, 166/64, 316, 113; 73/430, 431; 267/141.2

[56] References Cited

U.S. PATENT DOCUMENTS

| | | | |
|---|---|---|---|
| 3,714,831 | 2/1973 | Quichaud et al. | 175/40 X |
| 4,265,305 | 5/1981 | Stone et al. | 166/113 |
| 4,817,710 | 4/1989 | Edwards et al. | 73/431 X |
| 4,901,804 | 2/1990 | Thometz et al. | 175/40 |
| 4,932,471 | 6/1990 | Tucker et al. | 166/113 X |
| 5,320,169 | 6/1994 | Delatorre | 166/242 X |

OTHER PUBLICATIONS

"The Gearhart MWD System" catalogue, Gearhart Industries, Inc.

Primary Examiner—Stephen J. Novosad
Attorney, Agent, or Firm—William W. Haefliger

[57] ABSTRACT

An apparatus for the protection of instrumentation placed within a drill string in a well, as during drilling comprising support structure, including a carrier sized for reception in the string, and; elastomeric structure carried by the support structure and including multiple elastomeric pads spaced about a longitudinal axis defined in the well, the pads extending generally longitudinally, and protruding in directions radially of the axis to absorb radial loading and torsional loading exerted in direction about the axis, and to deflect in said directions of radial and torsional loading.

19 Claims, 7 Drawing Sheets

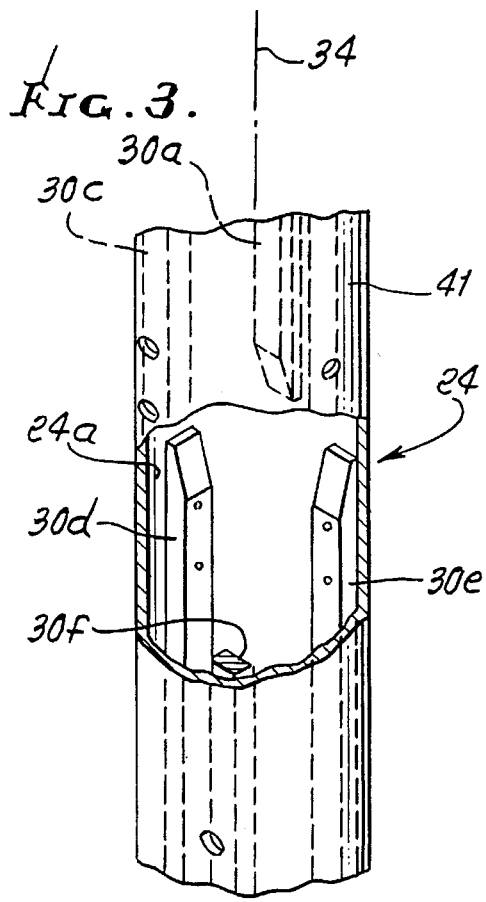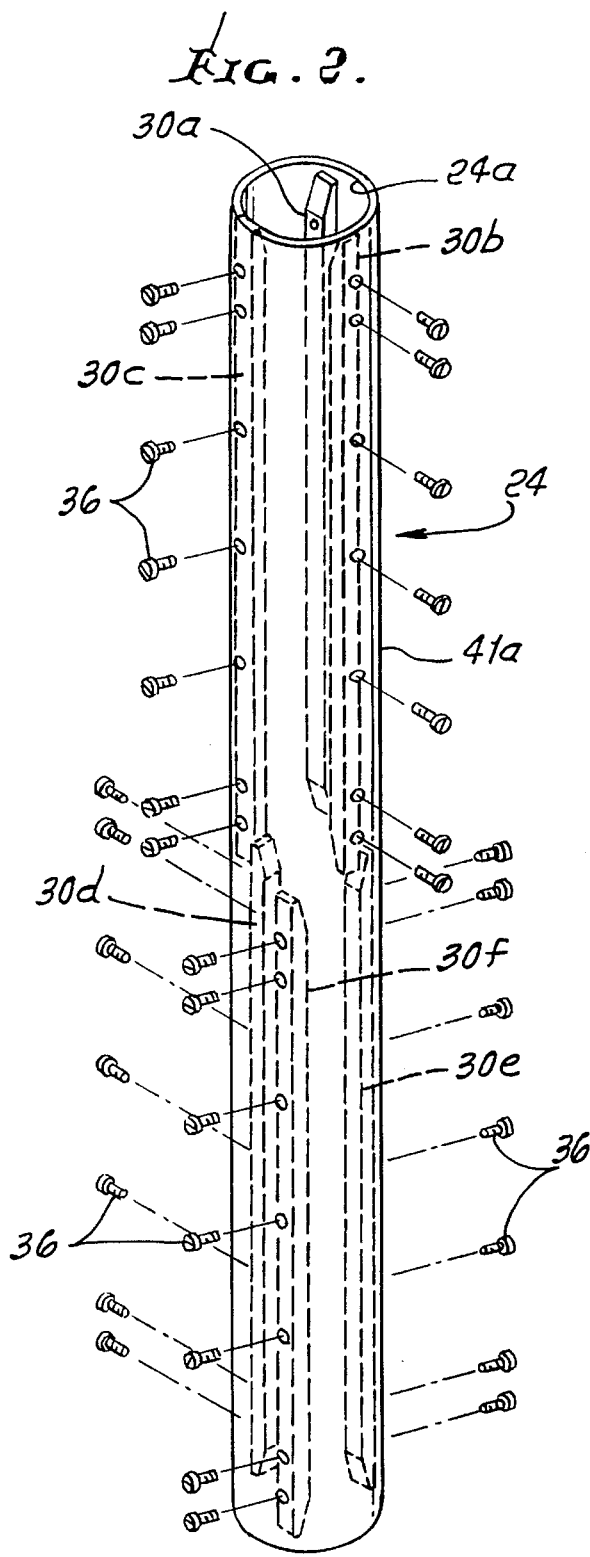

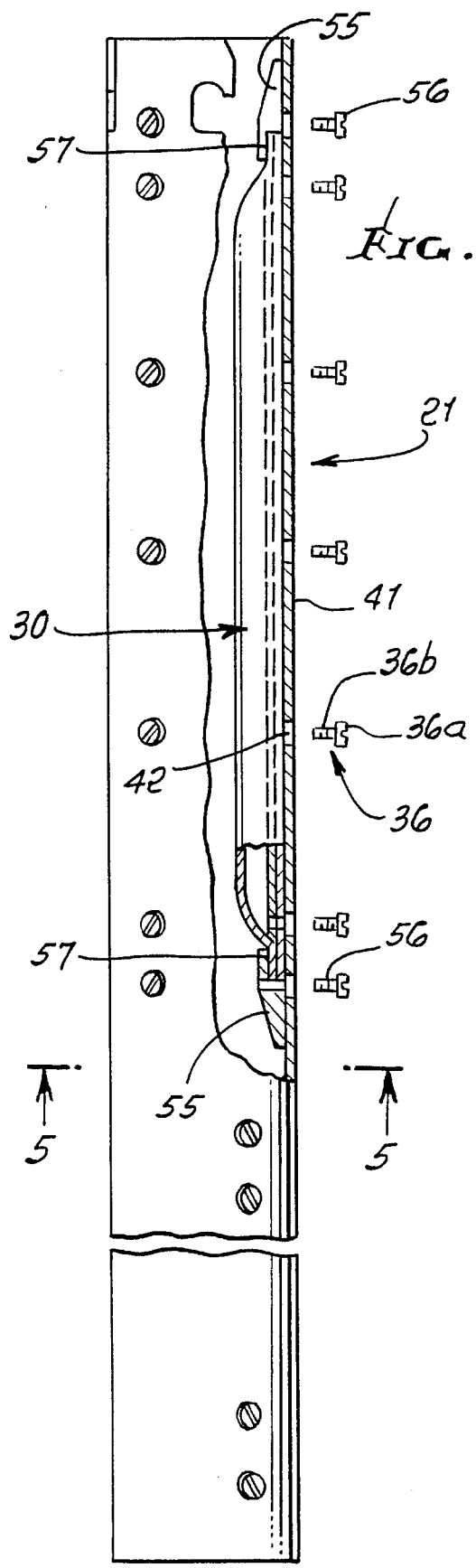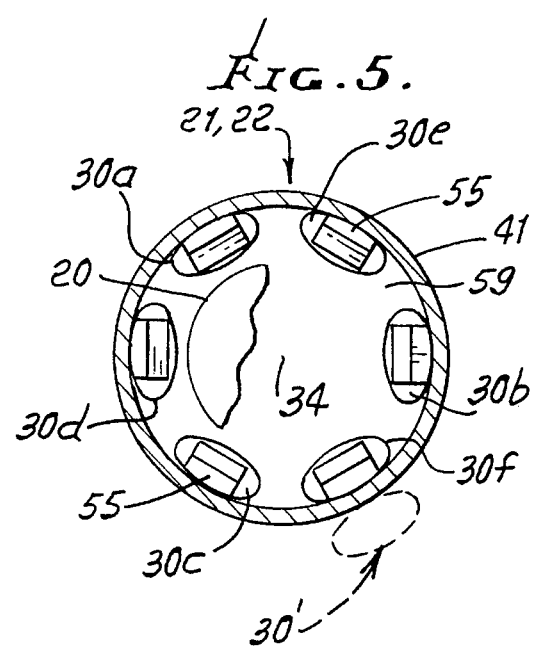

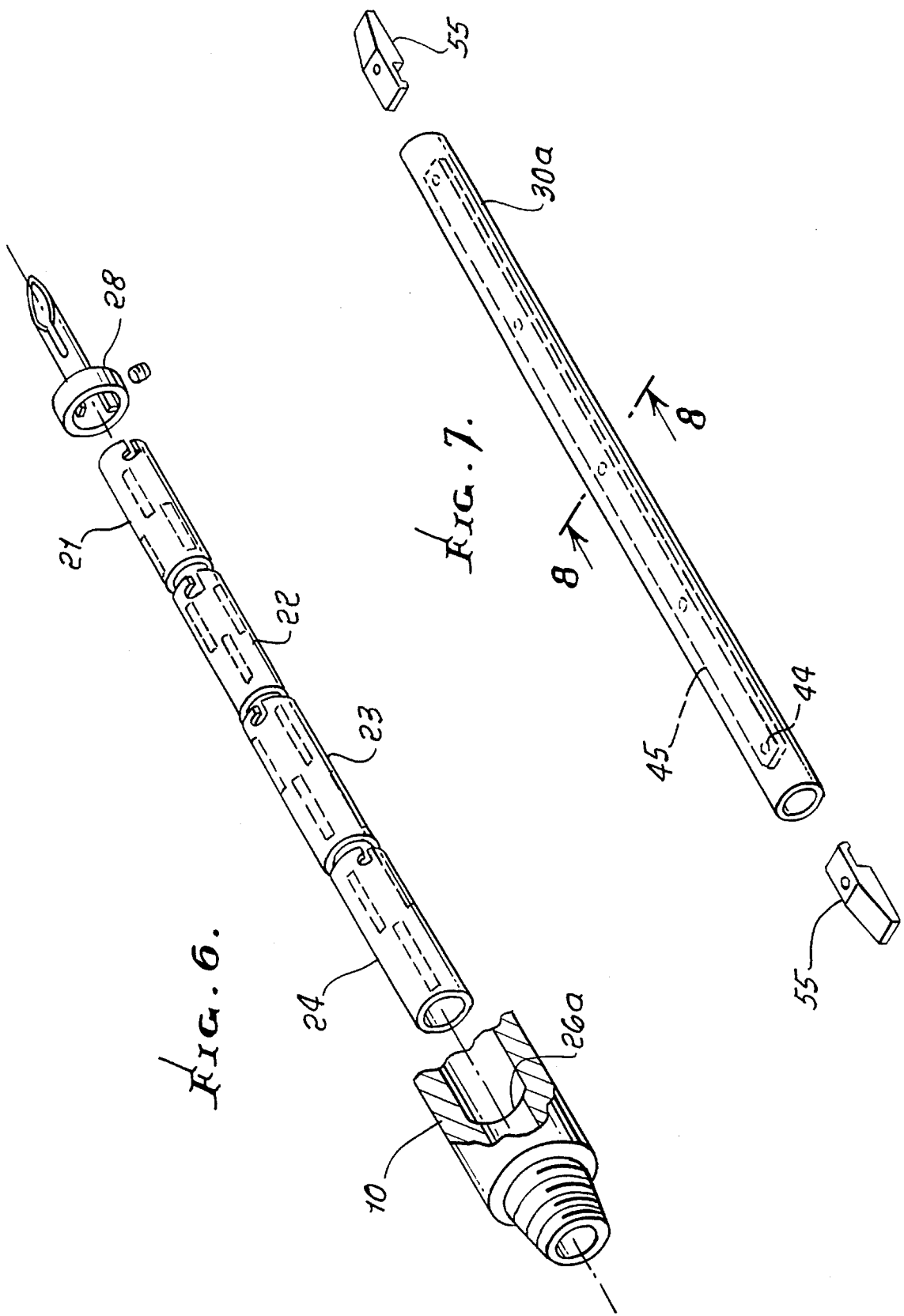

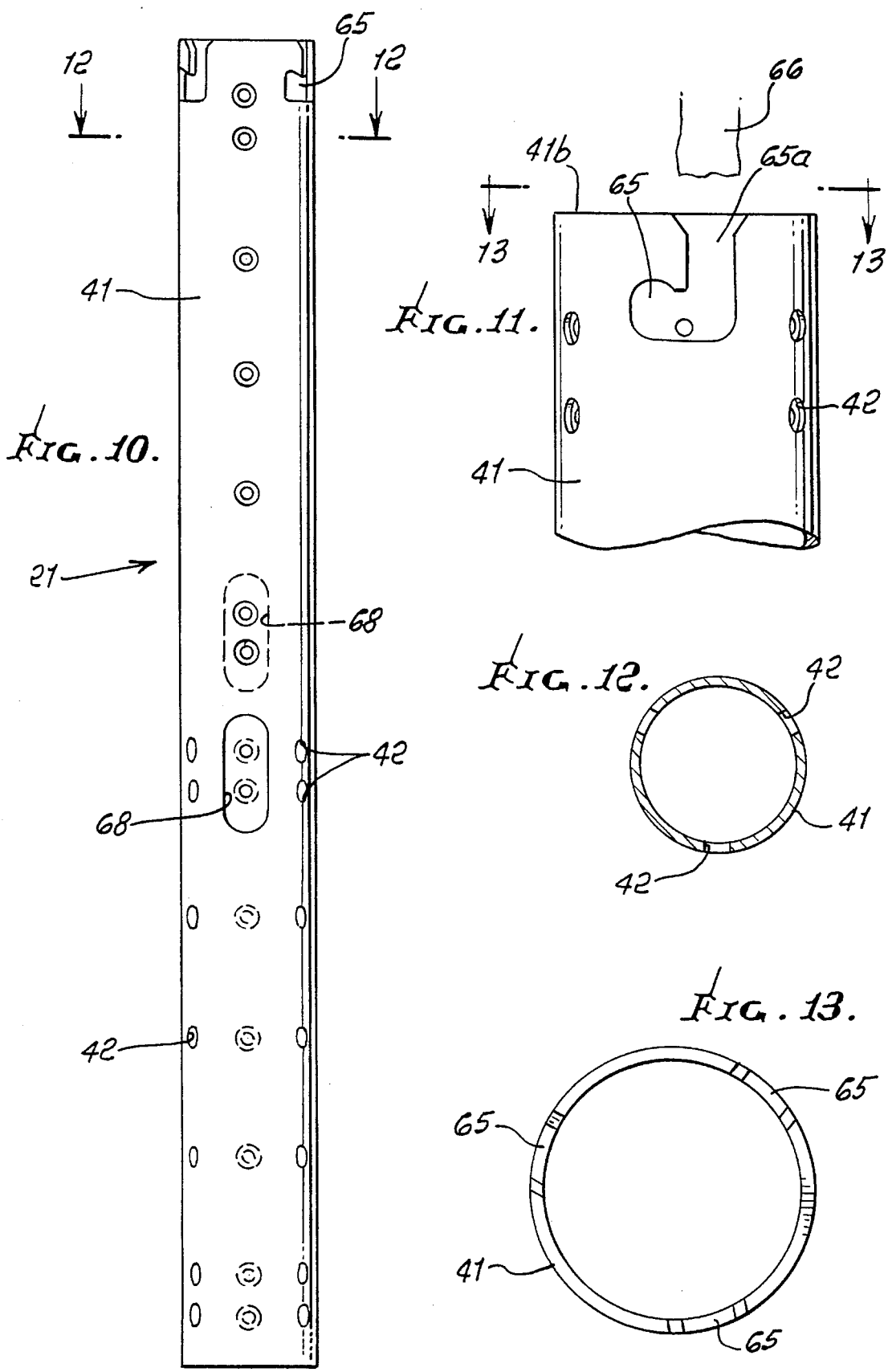

FIG. 14.
FIG. 15.
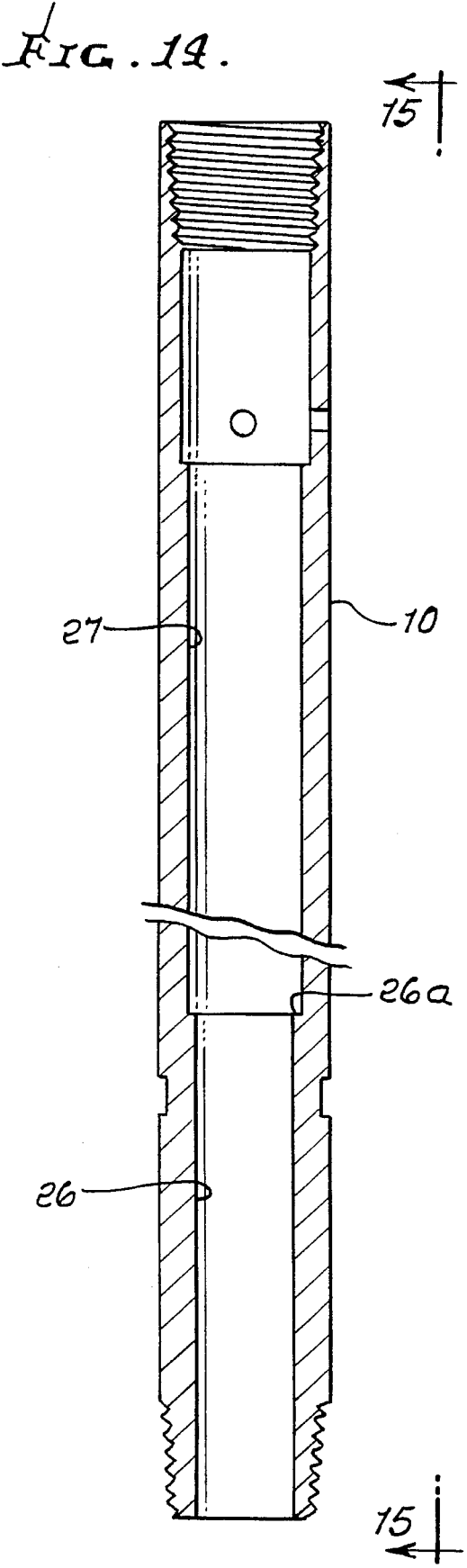
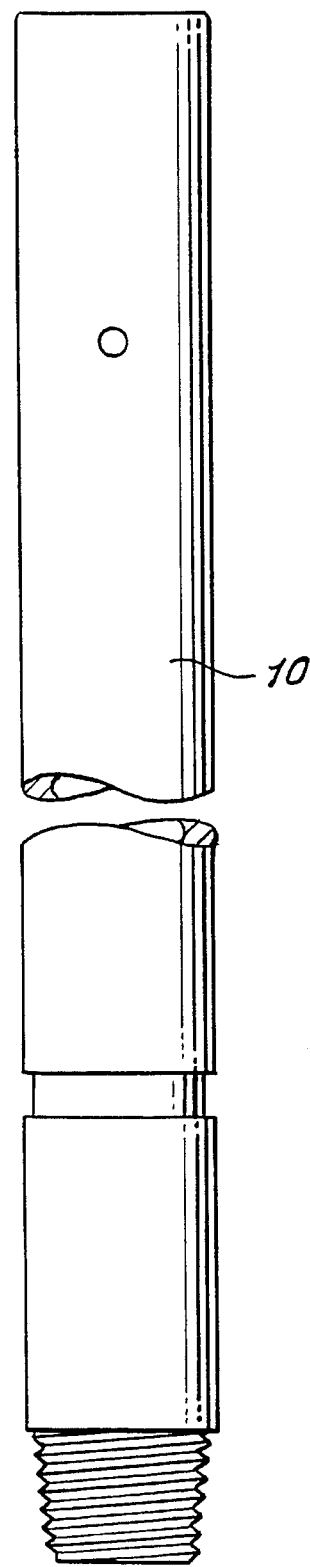

5,520,246

MULTI-MODE CUSHIONING AN INSTRUMENT SUSPENDED IN A WELL

BACKGROUND OF THE INVENTION

This invention relates generally to cushioning of loads exerted in a well; and more particularly, to cushioning located in a well to absorb or cushion loads exerted radially of a well axis, and/or loads exerted about that axis, i.e., torsional loads.

There is need to protect instrument packages traveled in well drill pipe or tubing strings; and in particular, there is need for such protection against loads exerted radially, and/or torsionally on such packages, or other devices traveled in a well.

SUMMARY OF THE INVENTION

It is a major object of the invention to provide improved apparatus meeting the above need or needs. Basically, the apparatus of the invention comprises, in combination:

a) support structure, sized for reception in the string, to be carried by the string, and b) elastomeric structure carried by the support structure, and including multiple elastomeric pads spaced about a longitudinal axis defined in the well, the pads extending generally longitudinally, and protruding in directions radially of the axis to absorb radial loading and torsional loading exerted in directions about the axis, and to deflect in said directions of radial and torsional loading.

As will be seen, a carrier movable relative to the string may carry the elastomeric structure, and the elastomeric structure typically defines hollows to receive cushioning fluid, such as well fluid, and orifices are typically provided to pass well fluid between the interior and the exterior of the hollows in response to loading. The hollows are preferably formed in the pads, as are the orifices.

Another object is to provide at least three of the pads spaced about the axis; and there may be multiple sets of such pads, the sets spaced apart axially, and may be staggered, as will be seen.

A further object is to provide pad support structure that includes cores to which the pads are attached, the carrier having an inner side and an outer side, the cores attached to the carrier at the inner side thereof. Such cores may be attached to the carrier as by fasteners. The cores may have longitudinally spaced opposite ends; and blocking structure is typically attached to the carrier to interfit the core ends to block core and pad endwise displacement. The blocking structure also deflects movement of instrumentation in the carrier to endwise engage the pads, and not the cores. Thus, a shielding and centralizing function is provided.

Yet another object is to locate the cushioning pads outside the carrier, as will be seen.

These and other objects and advantages of the invention, as well as the details of an illustrative embodiment, will be more fully understood from the following specification and drawings, in which:

DRAWING DESCRIPTION

FIG. 2 is a perspective view of a carrier, with pads therein;

FIG. 3 is a view showing the FIG. 2 carrier broken away in part to show interior construction;

FIG. 4 is a side elevation showing a carrier partly broken away to show interior construction;

FIG. 5 is an enlarged section taken on lines 5—5 of FIG. 4;

FIG. 6 is an exploded perspective view showing multiple carriers as related to drill pipe;

FIG. 7 is an exploded view showing a cushioning pad, as related to end blocks;

FIG. 10 is a side elevation showing a carrier;

FIG. 11 is an enlarged side elevation showing a J-slot connector on the carrier;

FIG. 12 is an enlarged section taken on lines 12—12 of FIG. 10;

FIG. 13 is an end view taken on lines 13—13 of FIG. 11;

FIG. 14 is a section taken through a non-magnetic drill collar;

FIG. 15 is a side elevation taken on lines 15—15 of FIG. 14; and

DETAILED DESCRIPTION

Figure 16:
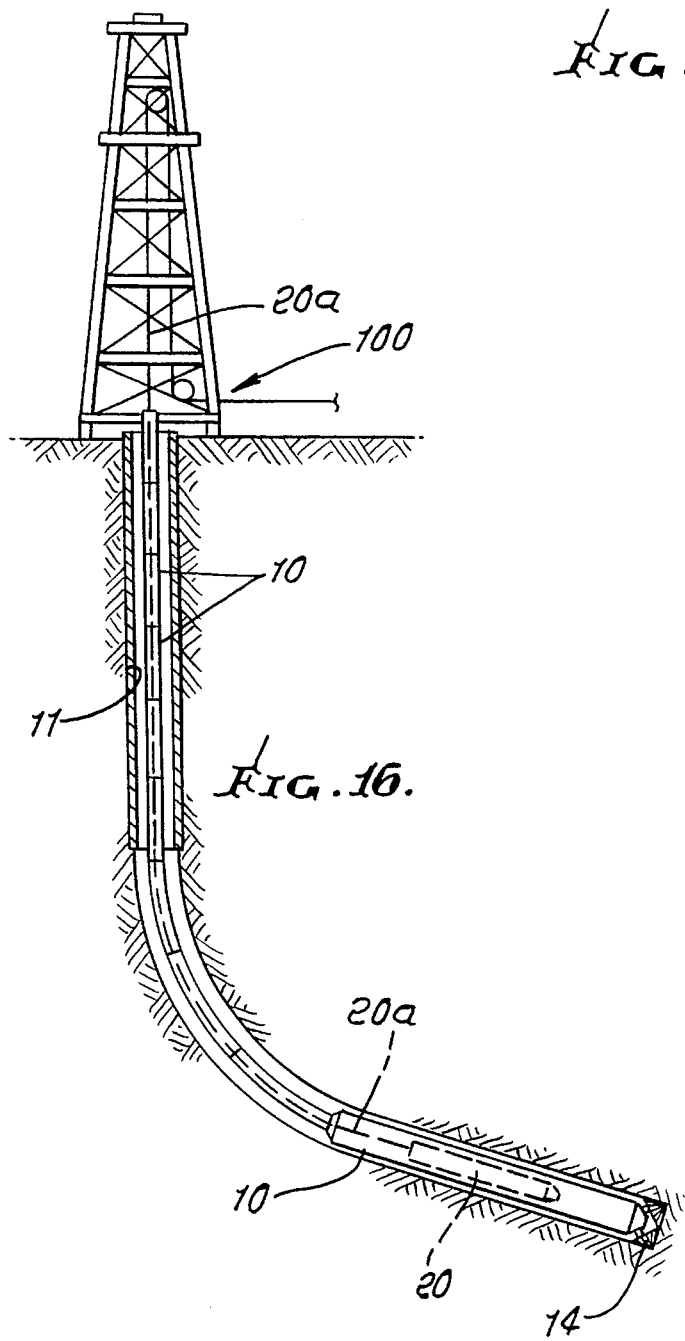
FIG. 16 shows use of the centralizing and cushioning means in a well.
Figure 1:
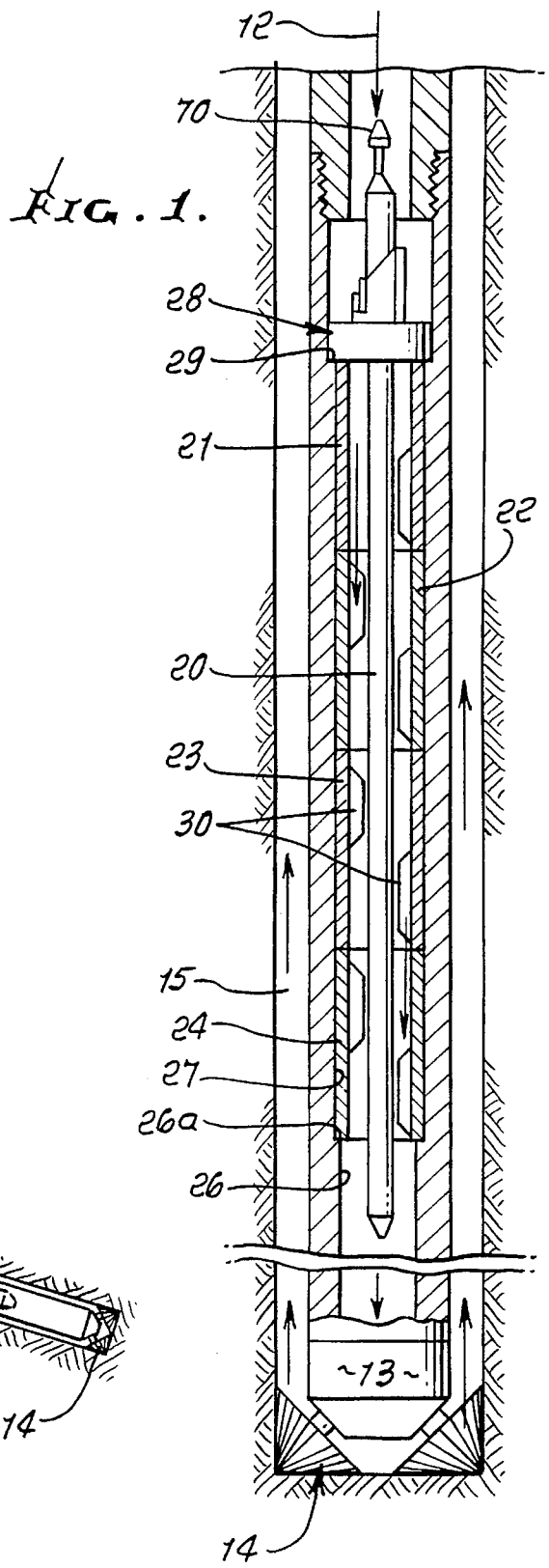
FIG. 1 is a vertical elevation showing one form of apparatus incorporating the invention, installed in a well.

Referring first to FIGS. 1 and 16, a drill string pipe 10 is shown in a well 11, with drilling mud circulating downwardly at 12. Such mud travels to the mud motor 13, effecting its operation to rotate and drill bit 14, which drills the well downwardly. Elements 13 and 14 are schematically shown.

Drill cuttings are carried upwardly by the circulating mud flowing upwardly in the annulus 15 between the well bore and the string, as is well known. The mud and cuttings flow to the surface for separation of cuttings and return of mud to the string.

As the motor and drill bit cuts against the underground formation, there is axial and sideward shock loading and rotary shock loading, all transmitted to the lower end of the string, as to pipe or collar 10 causing the pipe or collar to move axially up and down, and sidewardly back and forth, and to move rotatably back and forth about the pipe axis, such movements constituting vibration in multiple modes.

A well survey instrument 20 is shown lowered in the hole, by line 20a, to the location, as shown, within the drill pipe. One example is a magnetic survey tool, such tool being well known. FIG. 16 shows the hole 11 deviated to near horizontal, the well head indicated at 100. In order that such instrument may operate to best advantage, its substantial isolation from the multi-mode vibrating motion of the drill pipe 10 is sought, in accordance with the invention, as by cushioning the instrument. This is particularly desirable when the instrument 20 is very narrow (say one inch to one and one-half inch in diameter), since it is subjected to bending and flutter, disturbing its operation.

As contemplated, such cushioning is effected by hydraulically cushioning the instrument, both radially and rotatably, as by means acting to isolate the tool, as by dampening radial and torsional vibration. One way to accomplish this is by means of pads 30, which may include pads 30a–30c, as in FIG. 2. The pads are elongated as shown, and held in place as via fasteners 36 extending through side openings in the wall 41 of a carrier, as at 24 in FIG. 2, and into metallic cores 37 associated with the pads. A second set of circularly spaced pads 30d–30f is also shown in and attached to the carrier 41, but circularly staggered relative to pads 30a–30c.

Figure 8:
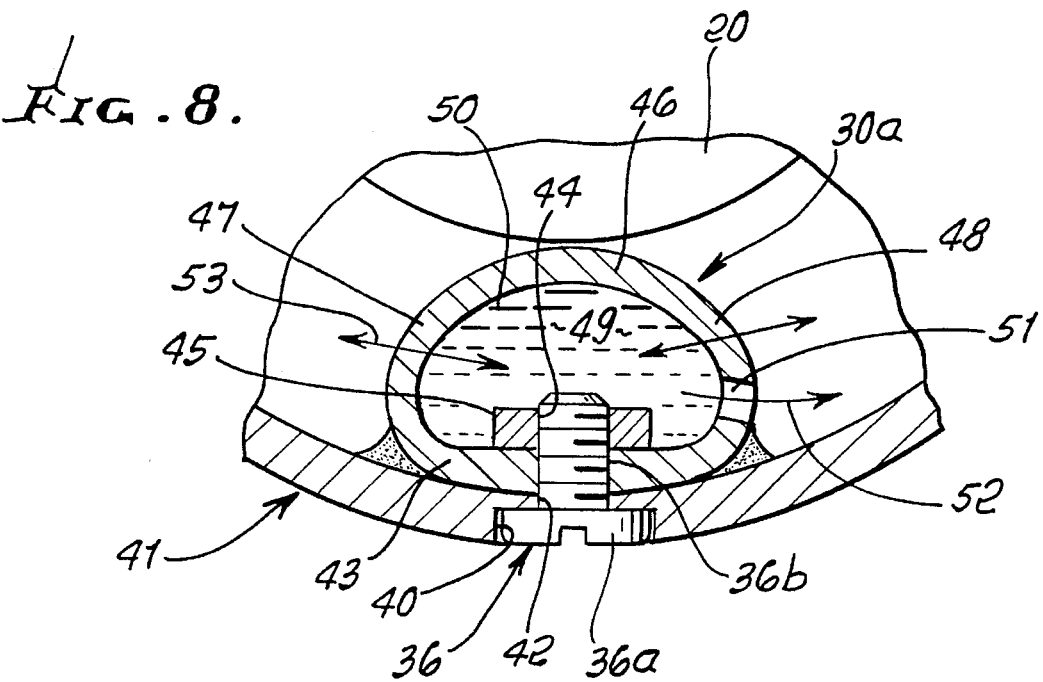
FIG. 8 is an enlarged section taken on lines 8—8 of FIG. 7.

See for example FIGS. 4 and 8 showing fasteners 36, each having a head 36a received in counterbore 40 in the carrier wall 41; and a fastener shank 36b extending through bore 42 in wall 41, through pad elastomeric outer wall 43, and into a threaded opening 44 in a core plate 45. The pad has an inner wall 46 spaced from 43, and free standing side walls 47 and 48 protruding, as shown in FIG. 8. A pad hollow 49 receives well fluid 50 via orifices 51 in a pad side wall or walls at upper and lower ends of the pad. Arrows at 52 show hydraulic well fluid flow into and out of the pad in response to wall 46 movement radially and/or wall. 47 and 48 movements circumferentially (see arrows 53). Such movements occur in response to engagement of the pipe-vibrated pad with the instrument 20.

The pad structures provide both radial and rotary cushioning, with hydraulic dampening, due to restricted flow through the orifices. The multiple pads spaced about the pipe axis all contribute to such multi-mode vibration isolation and protect the instrument 20.

To repeat, support structure is provided including a carrier, or stackable carriers, are provided for reception in the drill string; and elastomeric structure is carried by the support structure, examples being multiple elastomeric pads spaced about the carrier longitudinal axis. The pads typically extend generally longitudinally and protrude in directions radially of the axis to absorb radial loading as well as torsional loading exerted in directions about the axis, and to deflect in directions of radial and torsional loading.

Further, the elastomeric structure, such as the pads, typically define hollows to receive cushioning fluid, such as well fluid, which moves into and out of the pads via orifices to provide dampening of pad relative movement, radially and torsionally, in response to vibrating movement of the drill string or non-magnetic collar, relative to the survey instrument centered by the pads.

In FIG. 1, four tubular carriers 21–24 are shown, stacked end-to-end, the lowermost seated at step shoulder 26a provided in the drill pipe or non-magnetic collar between bore 26 and the enlarged bore or counterbore 27 in the collar. A hold down 28 engages the top uppermost carrier 21 at 29. The hold down 28 may comprise an annular part via which the instrument 20 is suspended. Hollow elastomeric pads 30 are supported by the carriers to protrude inwardly into close proximity to the casing or wall 20a of the elongated survey instrument 20, for cushioning relative motion, with dampening, between the drill string and pads on the one hand, and the instrument 20, on the other hand.

FIGS. 2 and 3 show a single cylindrical carrier 24 defining a bore 24a against which two sets of cushioning pads are supported. Upper set includes pads 30a–30c, spaced equidistantly about the carrier axis 34; and lower set includes pads 30d–30f also spaced equidistantly about axis 34, but staggered relative to pads 30a–30c, with the cushioned instrument 20 also indicated in FIG. 8. This affords additional support of the instrument package in directions normal to the bore axis. Spiral of angular positioning of the pads may alternatively be employed. Staggering may be omitted. Multiple fasteners 36 are shown to retain the pads, as described in FIG. 8, while allowing their radial and torsional resilient cushioning and dampening, as described above.

Further features are as follows:

1) The carriers 21–24, cores 45 and fasteners 36 may consist of non-magnetic material, such as stainless steel or brass, so as not to interfere with the magnetic survey performed by tool 20.

2) Room temperature vulcanizing (R.T.V.) material 70, or other like material, is applied at locations 71 and 72 between the pad and carrier, as seen in FIG. 8, and also at 73, to further attach the pad to the carrier, and to block endwise creep of the pad, under axial loading imposed by the instrument 20. In addition, the material 70 blocks out possible intrusion of contaminants and magnetic scale particles, which could otherwise become lodged and affect the magnetic calibration.

Figure 9:
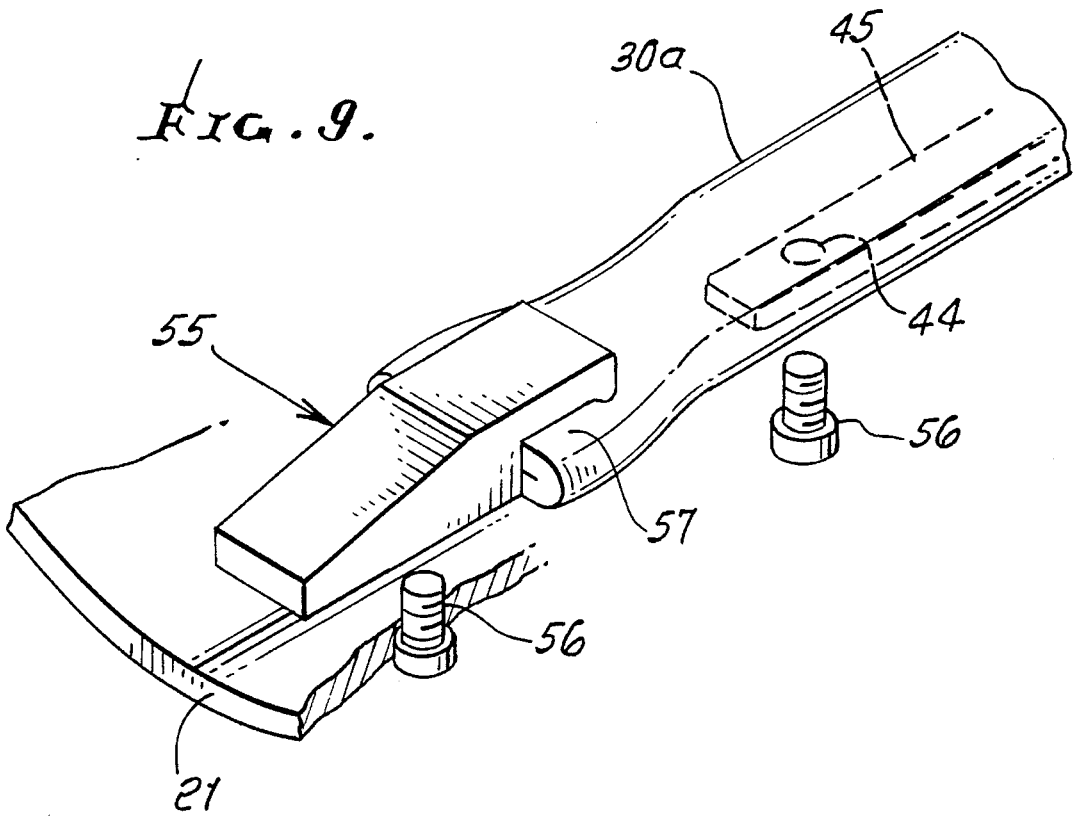
FIG. 9 is a perspective view showing an end block holding a pad structure in position.

3) Blocks 55 are installed at opposite ends of the cores (see FIGS. 4, 7 and 9) to resist endwise creep of the pads. The blocks are connected by fasteners 56 to the carrier; and they overlap end extents 57 of the pads.

4) Spaces 59, formed between circularly successive pads, allow mud flow downwardly within the carrier. The spaces 59 also extend radially between the instrument 20 and the bore of the carrier. See FIG. 5.

5) Merely as illustrative, the wall thickness of an elastomeric pad 30 may typically be between 1/16 inch and 3/16 inch; and the diameter or cross dimension of an orifice 51 may be about 1/4 inch. The length of the pad 30 may be between 12 and 36 inches.

6) Typical instruments 20 include commercial magnetic survey tools known as EYE-II, made by Applied Navigation Devices, Paso Robles, Calif., and FINDER and KEEPER bore orientation tools produced by that company. Other instruments are also usable.

7) FIG. 11 shows the provision of a J-slot 65 in the end of a carrier wall 41, and opening at 65a through the carrier end 41b. That slot allows retrieval of the carrier endwise upwardly via a retrieval tool, indicated schematically at 66 in FIG. 11.

8) The survey tool 20 is shown in FIG. 1 as having a fishing neck at 70, by which it may be retrieved upwardly in the well, as by a retrieval tool.

9) The carriers may have elongated and enlarged through openings 68 in their side walls 41 to enable finger insertions, for installing or assembling the pads 30 and cores 45 in positions relative to fastener openings 42 in the carrier walls, at the wall head.

10) FIG. 5 also shows an alternate position of a pads 30', and its mounting structure at the outer side of a carrier 21 or 22.

Referring to FIG. 1, the carrier or carriers, as at 21–24, may be omitted, and the pads 30 may be fixedly or removably attached to the drill string, or a sub in the string, at the bore thereof.

A further advantage of the invention is the achieved relaxation of stresses on the instrument package 20, normal to directional drilling a bore hole. The instrument package is not "curved" as severely as the drill string itself, due to cushioning afforded by the pads 30; yet, the instrument package maintains an average centered position within the cushioning system, permitting string "dog-legs" more severe that normally would be tolerated.

I claim:

1. In apparatus for the protection of instrumentation placed within a drill string in a well, as during drilling, the combination comprising a) support structure, including a carrier sized for reception in the string, and b) elastomeric structure carried by said support structure and including multiple elastomeric pads spaced about a longitudinal axis defined in the well, said pads extending generally longitudinally, and protruding in directions radially of said axis to absorb radial loading and torsional loading exerted in directions about said axis, and to deflect in said directions of radial and torsional loading, c) said apparatus being centrally open throughout the longitudinal length thereof.

2. The combination of claim 1 wherein said elastomeric structure defines hollows to receive cushioning fluid.

3. The combination of claim 2 wherein there are orifices in said elastomeric pads to pass well fluid between the interior and the exterior of said hollows in response to said loading.

4. The combination of claim 1 wherein there are at least three of said pads spaced about said axis.

5. The combination of claim 1 wherein there are at least three of said pads in a first set, spaced about said axis and from one another, and at least three of said pads in a second set, spaced about said axis and from one another.

6. The combination of claim 5 wherein said two sets of pads are spaced apart axially, in the well.

7. In apparatus for the protection of instrumentation placed within a drill string in a well, as during drilling, the combination comprising a) support structure, including a carrier sized for reception in the string, and b) elastomeric structure carried by said support structure and including multiple elastomeric pads spaced about a longitudinal axis defined in the well, said pads extending generally longitudinally, and protruding in directions radially of said axis to absorb radial loading and torsional loading exerted in directions about said axis and to deflect in said directions of radial and torsional loading, c) there being at least three of said pads in a first set, spaced about said axis and from one another, add at least three of said pads in a second set, spaced about said axis and from one another, d) the pads in the first and second sets being relatively staggered about said axis.

8. The combination of claim 2 wherein said hollows extend in said pads.

9. The combination of claim 1 wherein said support structure includes cores to which said pads are attached, said carrier having an inner side and an outer side, said cores attached to the carrier at said inner side thereof.

10. The combination of claim 1 wherein said carrier is generally tubular, the pads defining said hollows.

11. In apparatus for the protection of instrumentation placed within a drill string in a well, as during drilling, the combination comprising a) support structure including a carrier sized for reception in the string, and b) elastomeric structure carried by said support structure and including multiple elastomeric pads spaced about a longitudinal axis defined in the well, said pads extending generally longitudinally, and protruding in directions radially of said axis to absorb radial loading and torsional loading exerted in directions about said axis and to deflect in said directions of radial and torsional loading, c) said support structure including cores to which said pads are attached, said carrier having an inner side and an outer side, said cores attached to the carrier at said inner side thereof, d) said carrier being generally tubular, there being longitudinally spaced fasteners attaching the cores to the tubular carrier.

12. The combination of claim 11 wherein said cores extend longitudinally and are spaced about said axis, said cores having longitudinally spaced opposite ends, and there being blocking structure attached to the carrier and interfitting said core ends to block endwise displacement of the cores and to shield the cores from endwise engagement with instrumentation traveling in the well.

13. In apparatus for the protection of instrumentation placed within a drill string in a well, as during drilling, the combination comprising a) support structure, including a carrier sized for reception in the string, and b) elastomeric structure carried by said support structure and including multiple elastomeric pads spaced about a longitudinal axis defined in the well, said pads extending generally longitudinally, and protruding in directions radially of said axis to absorb radial loading and torsional loading exerted in directions about said axis, and to deflect in said directions of radial and torsional loading, c) said carrier being generally tubular and having an inner side and an outer side, said pads being at the inner side of the carrier.

14. The combination of claim 1 wherein said carrier is generally tubular and has an inner side and an outer side, said pads located at the outer sides of the carrier.

15. The combination of claim 13 including instrumentation extending endwise in the carrier for sideward engagement with the pads.

16. In apparatus for the protection of instrumentation placed within a drill string in a well, as during drilling, the combination comprising a) support structure, sized for reception in the string, to be carried by the string, and b) elastomeric structure carried by said support structure and including multiple elastomeric pads spaced about a longitudinal axis defined in the well, said pads extending generally longitudinally, and protruding in directions radially of said axis to absorb radial loading and torsional loading exerted in directions about said axis, and to deflect in said directions of radial and torsional loading, c) said apparatus being centrally open throughout the longitudinal length thereof.

17. The combination of claim 16 wherein said elastomeric structure defines hollows to receive cushioning fluid.

18. The combination of claim 17 wherein there are orifices in said elastomeric pads to pass well fluid between the interior and the exterior of said hollows in response to said loading.

19. The combination of claim 16 wherein there are at least three of said pads spaced about said axis.

\* \* \* \* \*